(12) United States Patent
Gambino et al.

(10) Patent No.: US 9,874,690 B2
(45) Date of Patent: Jan. 23, 2018

(54) INTEGRATED WAVEGUIDE STRUCTURE WITH PERFORATED CHIP EDGE SEAL

(71) Applicant: INTERNATIONAL BUSINESS MACHINES CORPORATION, Armonk, NY (US)

(72) Inventors: Jeffrey P. Gambino, Westford, VT (US); Robert K. Leidy, Burlington, VT (US); Steven M. Shank, Jericho, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 122 days.

(21) Appl. No.: 14/046,506

(22) Filed: Oct. 4, 2013

(65) Prior Publication Data
US 2015/0097257 A1    Apr. 9, 2015

(51) Int. Cl.
G02B 6/122    (2006.01)
G02B 6/42     (2006.01)
G02B 6/12     (2006.01)

(52) U.S. Cl.
CPC ............ *G02B 6/122* (2013.01); *G02B 6/423* (2013.01); *G02B 2006/12061* (2013.01); *G02B 2006/12123* (2013.01)

(58) Field of Classification Search
CPC ... H01L 31/107; H01L 33/58; H01L 31/0232; H01L 31/1407; G02B 6/122
USPC .......................................................... 385/14
See application file for complete search history.

(56) References Cited

U.S. PATENT DOCUMENTS

| | | | |
|---|---|---|---|
| 6,504,140 B1 * | 1/2003 | Ueno ............... | H01L 27/14643 250/214 C |
| 6,975,792 B1 | 12/2005 | Goldberg et al. | |
| 7,123,787 B1 | 10/2006 | McIntyre | |
| 8,021,900 B2 | 9/2011 | Maxwell et al. | |
| 2002/0122613 A1 * | 9/2002 | Kittaka et al. .................. | 385/14 |
| 2002/0136520 A1 * | 9/2002 | Janus ................... | G02B 6/4478 385/134 |
| 2003/0193090 A1 * | 10/2003 | Otani et al. .................... | 257/758 |
| 2003/0231161 A1 * | 12/2003 | Yamaguchi .......... | G09G 3/3406 345/102 |
| 2005/0006678 A1 * | 1/2005 | Tanaka et al. ................ | 257/292 |

(Continued)

OTHER PUBLICATIONS

Chen, X. et al., "Apodized Waveguide Grating Couplers for Efficient Coupling to Optical Fibers," IEEE Photonics Technology Letters, Aug. 1, 2010, pp. 1156-1158.

(Continued)

*Primary Examiner* — Thao X Le
*Assistant Examiner* — Geoffrey Ida
(74) *Attorney, Agent, or Firm* — David Cain; Andrew M. Calderon; Roberts Mlotkowski Safran Cole & Calderon P.C.

(57) ABSTRACT

An integrated waveguide structure with perforated chip edge seal and methods of manufacture are disclosed herein. The structure includes a guard ring structure surrounding an active region of an integrated circuit chip. The structure further includes a gap in the guard ring structure which is located at a predetermined level of the integrated circuit chip. The structure further includes a waveguide structure formed on a substrate of the integrated circuit chip. The structure further includes a fiber optic optically coupled to the waveguide structure through the gap formed in the guard ring structure.

20 Claims, 5 Drawing Sheets

(56) References Cited

U.S. PATENT DOCUMENTS

| | | | |
|---|---|---|---|
| 2006/0012012 A1* | 1/2006 | Wang | H01L 23/562 |
| | | | 257/620 |
| 2009/0022500 A1* | 1/2009 | Pinguet et al. | 398/164 |
| 2012/0014638 A1 | 1/2012 | Fujil et al. | |
| 2012/0134632 A1 | 5/2012 | Yamamoto et al. | |
| 2013/0077918 A1 | 3/2013 | Mizutani et al. | |

OTHER PUBLICATIONS

Chen, Shih-Hung et al., "Investigation on seal-ring rules for IC product reliability in 0.25-um CMOS technology," Microelectronics Reliability 45, 2005, pp. 1311-1316.

Green, W. M. J. et al., "Silicon photonic wire circuits for on-chip optical interconnects," Proc. of SPIE vol. 6883, 2008, 10 pages.

Gunn, C., "CMOS Photonics for High-Speed Interconnects," IEEE Computer Society, 2006, pp. 58-66.

Lindenmann, N. et al., "Photonic wire bonding: a novel concept for chipscale interconnects," Optics Express, Jul. 2012, vol. 20, No. 16, 11 pages.

Mekis, A. et al., "A Grating-Coupler-Enabled CMOS Photonics Platform," IEEE Journal of Selected Topics in Quantum Electronics, Nov. 28, 2010, pp. 597-608.

Narasimha, A. et al., "A Fully Integrated 4x 10-Gb/s DWDM Optoelectronic Transceiver Implemented in a Standard 0.13 um CMOS SOI Technology," IEEE Journal of Solid-State Circuits, Dec. 2007, pp. 2736-2744.

Pinguet, T. et al., "Monolithically Integrated High-Speed CMOS Photonic Transceivers," IEEE, 2008, pp. 362-364.

Specification and drawings for the U.S. Appl. No. 13/437,273, filed Apr. 2, 2013, 26 pages.

Specification and drawings for the U.S. Appl. No. 13/782,537, filed Mar. 1, 2013, 37 pages.

* cited by examiner

INTEGRATED WAVEGUIDE STRUCTURE WITH PERFORATED CHIP EDGE SEAL

FIELD OF THE INVENTION

The invention relates to semiconductor structures and, more particularly, to an integrated waveguide structure with perforated chip edge seal and methods of manufacture.

BACKGROUND

Guard rings are structures fabricated along the perimeter of an integrated circuit chip to prevent delamination of the various layers of the integrated circuit chip and other edge damage that may occur during "dicing" of individual integrated circuit chips. The guard rings can protect the active area of the chip from moisture, mobile ions, and mechanical damage. For example, the guard rings can prevent moisture from corroding the structures on the integrated circuit chip. Also, the guard rings can prevent damage to the components within an active area of the integrated circuit due to cracking that may form during the dicing process.

More specifically, after formation of the active and passive components, the wafer is cut or diced into individual integrated circuit chips, either by sawing or by scribing and breaking. During the cutting or dicing process, the wafer is subjected to high shear stresses which can cause cracks extending inwardly from the edges of each chip. Due to the stresses encountered when dicing the chip, or even later during use, cracks can propagate inward from the edges of the chip and eventually reach the active portion of the chip, damaging semiconductor devices disposed in the active region. Guard rings, though, can prevent the propagation of cracks from reaching the active region of the chip.

High speed interconnects are required in computer systems, at the chip level, for chip-to-chip communications and for server-to-server communications. As device speeds increase, it is increasingly difficult for electrical interconnects to provide the required performance in terms of bandwidth, power consumption, and cross-talk. For this reason, optical interconnects have been implemented, which provide an attractive alternative to the electrical connections. However, the cost of optical interconnects is high, and must be reduced in order for optical interconnects to be competitive in the marketplace.

Optical interconnects require Si waveguide structures integrated onto a CMOS die (chip). The Si waveguide structure, though, is not compatible with a standard edge seal ring, e.g., guard ring, which is a wall of metal that surrounds the chip (die). For example, guard rings are typically in the form of a metallic ring-like structure positioned between the active region of the chip and the edge of the chip so as to encompass the active region of the chip. The guard ring typically extends vertically upward from a semiconductor device layer of the chip through all of the back-end-of-line ("BEOL") metallization layers (also referred to herein as wiring levels) of the chip. For example, guard rings are typically formed by a plurality of metal vias and wiring layers that surround other circuitry of the chip. These metal vias and wiring layers are typically formed by depositing metal layers within openings of a dielectric layer. However, by using a standard guard ring, the light into or out of the waveguide structure will be blocked at the perimeter of the chip.

SUMMARY

In an aspect of the invention, a structure comprises a guard ring structure surrounding an active region of an integrated circuit chip. The structure further comprises a gap in the guard ring structure which is located at a predetermined level of the integrated circuit chip. The structure further comprises a waveguide structure formed on a substrate of the integrated circuit chip. The structure further comprises a fiber optic optically coupled to the waveguide structure through the gap formed in the guard ring structure.

In an aspect of the invention, an integrated circuit chip comprises a guard ring structure around a perimeter of the integrated circuit chip, the guard ring structure comprising a plurality of metal wiring structures and vias within interlevel dielectric layers on one or more wiring levels of the integrated circuit chip. The integrated circuit chip further comprises a waveguide structure formed on a first device layer of the integrated circuit chip above a wafer substrate. The integrated circuit chip further comprises a fiber optic optically coupled to the waveguide structure through a gap in the guard ring structure, the gap being located above the waveguide structure.

In an aspect of the invention, a method comprises: forming a guard ring structure with a gap at a predetermined level of an integrated circuit chip; forming a waveguide structure on a substrate of the integrated circuit chip; and forming a fiber optic optically coupled to the waveguide structure through the gap formed in the guard ring structure.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of the structure, which comprises the integrated waveguide with perforated chip edge seal of the present invention. In still further embodiments, a method in a computer-aided design system is provided for generating a functional design model of the integrated waveguide with perforated chip edge seal. The method comprises generating a functional representation of the structural elements of the integrated waveguide with perforated chip edge seal.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to semiconductor structures and, more particularly, to an integrated waveguide structure with perforated chip edge seal and methods of manufacture. More specifically, the present invention is directed to an integrated waveguide structure formed through an opening in an edge seal, e.g., guard ring structure, at a contact level. Advantageously the opening in the guard ring structure allows light to enter the waveguide structure at the perimeter of the chip (die), while remaining small enough so that cracks do not propagate into the active area from the dicing channel. In embodiments, a hardmask material, e.g., SiN layers, can be provided over the devices and/or under the first metal layer, e.g., M1 metal, to protect the active area from moisture and mobile ion contamination.

In embodiments, the integrated waveguide structure with perforated chip edge seal (e.g., opening in the guard ring structure) can be manufactured in a number of ways using a number of different tools. In general, though, the methodologies and tools are used to form small structures with dimensions in the micrometer scale. The methodologies, i.e., technologies, employed to manufacture the integrated waveguide with perforated chip edge seal of the present invention have been adopted from integrated circuit (IC) technology. For example, the structures of the present invention are built on wafers and are realized in films of material patterned by photolithographic processes on the top of a wafer. In particular, the fabrication of the integrated waveguide structure with perforated chip edge seal and related structures of the present invention uses three basic building blocks: (i) deposition of thin films of material on a substrate, (ii) applying a patterned mask on top of the films by photolithographic imaging, and (iii) etching the films selectively to the mask.

Figure 1:
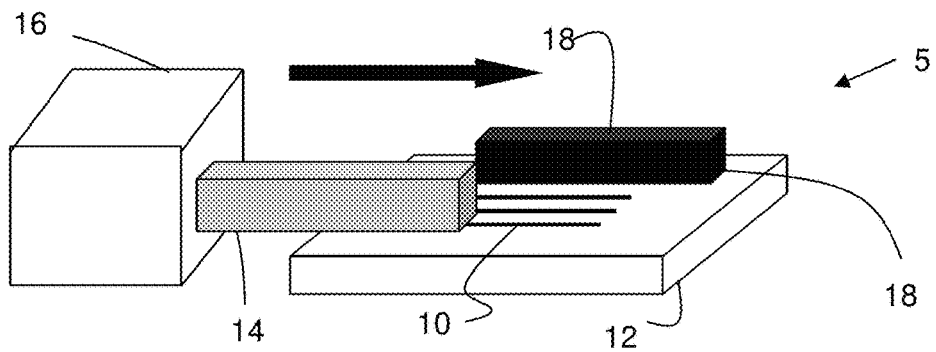
FIG. 1 shows a partially cut-away perspective view of a structure in accordance with aspects of the present invention.

FIG. 1 shows a partially cut-away perspective view of a structure in accordance with aspects of the present invention. More specifically, the structure 5 is an optical interconnect structure comprising a waveguide structure 10 formed on a die (chip) 12. In embodiments, the waveguide structure 10 can be a Si waveguide structure integrated into a substrate of the chip 12 using conventional CMOS processes. In embodiments, an optical fiber 14 is optically coupled to the waveguide structure 10 through an opening in a guard ring structure 18. The opening allows light to travel along the optical fiber 14 to the waveguide 10, as depicted by the arrow shown in FIG. 1. The optical fiber 14 can be, in embodiments, embedded in polymer or other insulator material, for example. A standard optical connecter 16 is connected to the optical fiber 14, as is well known in the art.

FIG. 1 further shows a cut-away view of the guard ring or seal edge structure 18 provided about a perimeter of the active portion of the chip 12. In embodiments, the guard ring or seal edge structure 18 prevents delamination of the various layers of the integrated circuit chip and other edge damage that may occur during "dicing" of individual integrated circuit chips 12, as well as protecting the active area of the chip 12 from moisture, mobile ions, and other mechanical damage. In embodiments of the present invention, though, the guard ring or seal edge structure 18 includes a gap (shown in FIGS. 2-7), which allows improved optical coupling between the optical fiber 14 and the waveguide structure 10.

Figure 2:
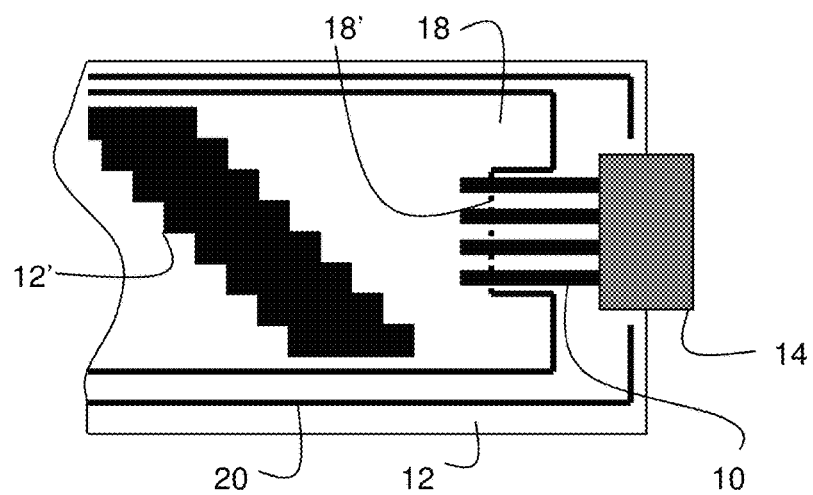
FIG. 2 shows a top view of the structure of FIG. 1 in accordance with aspects of the present invention.

FIG. 2 shows a top view of the structure of FIG. 1. As shown in this view, the guard ring or seal edge structure 18 includes a gap 18' which is structured and arranged to allow the optical fiber 14 to be optically coupled to the waveguide structure 10, without any interference from the guard ring or seal edge structure 18. That is, the gap 18' in the guard ring or seal edge structure 18 permits transmission of light from the optical fiber 14 to the waveguide structure 10. Accordingly, the gap 18' is a space devoid of the guard ring or seal edge structure 18, which results in a discontinuous guard ring or seal edge structure at a level of the circuit important for optical coupling of optical components. In embodiments, the spacing of the gap is small enough, e.g., about 1 μm to 50 μm and more preferably 3 μm to 5 μm, in order to prevent propagation of cracks during the dicing process.

FIG. 2 further shows the guard ring or seal edge structure 18 surrounding an active region 12' of the chip 12. As should be understood by those of skill in the art, the guard ring structure 18 will surround the active region 12' of the chip 12 at all wiring layers of the chip 12, except at the level of optical coupling of the optical fiber 14 to the waveguide structure 10. The gap 18' is provided at the level of the optical coupling. The active region 12' of the chip 12 includes active and passive components. For example, the active components can be transistors, diodes, etc.; whereas, the passive components can be wiring structures and metal vias. In further embodiments, the chip 12 also includes a crack stop structure 20 surrounding the guard ring or seal edge structure 18. The crack stop structure 20 will also prevent propagation of cracks during the dicing process, for example.

Figure 3A:
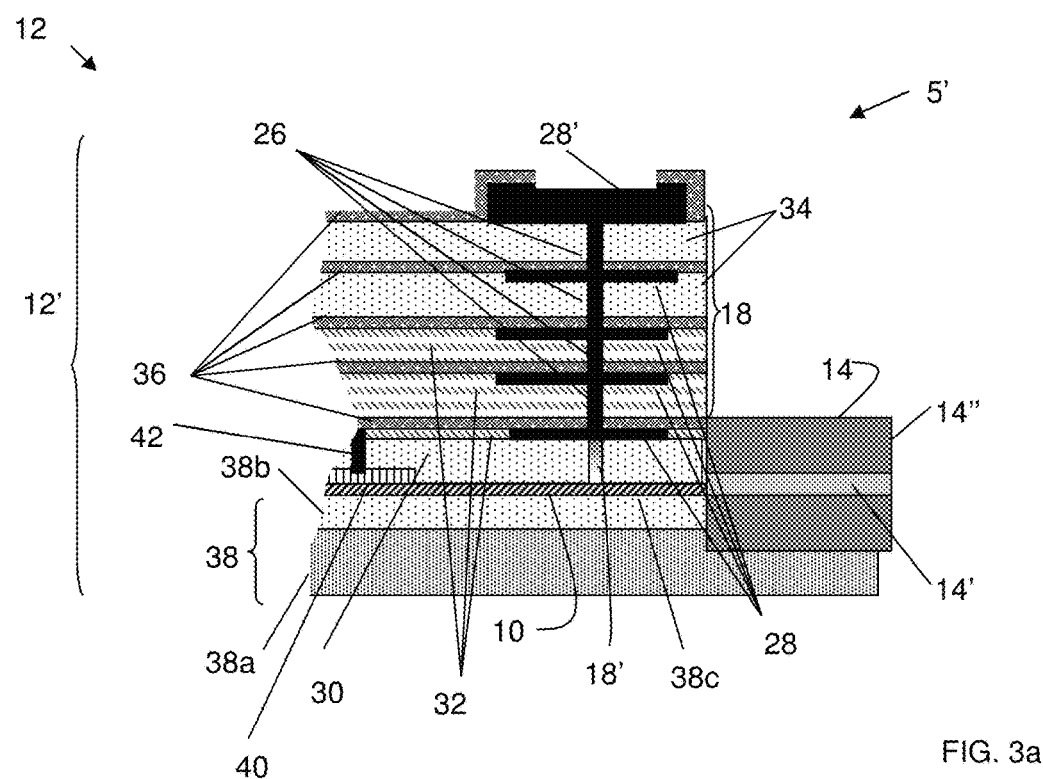
FIG. 3a shows processing steps and a respective structure in accordance with aspects of the present invention.

FIG. 3a shows processing steps and a respective structure 5' in accordance with aspects of the present invention. As shown in FIG. 3a, for example, the guard ring or seal edge structure 18 includes a plurality of vias 26 and wiring structures 28 formed on or within interlevel dielectric layers 30, 32 and 34, over the gap 18'. In embodiments, the guard ring or seal edge structure 18 can also include an upper wiring structure 28', which may be a landing pad for a solder connection. The vias 26 and wiring structures 28, 28' can be composed of any refractory metal or metal alloy. For example, the vias 26 can be composed of tungsten; whereas, the wiring structures 28 can be composed of copper and the wiring structure 28' can be composed of aluminum. The gap 18' is provided within the interlevel dielectric layer 30, under the vias 26 and wiring structures 28, 28'.

The guard ring or seal edge structure 18 can be fabricated using any conventional fabrication process, e.g., lithography, etching and deposition processes. For example, the wiring structures 28, 28' can be fabricated using an additive or subtractive process. By way of illustration, a first wiring structure can be formed within a lower dielectric layer 32 with subsequent wiring structures formed in upper dielectric layers 32 and 34, over the gap 18'. In embodiments, the dielectric layers 32 are composed of SiCOH; whereas, the dielectric layer 30 is composed of borophosphosilicate glass (BPSG) and dielectric layers 34 are composed of $SiO_2$. In alternative embodiments, the dielectric layers 30, 32 can be any combination of $SiO_2$, SiN, undoped or doped silicate glasses, such as BPSG, fluorosilicate glass (FSG), and phosphosilicate glass (PSG), and low-k (dielectric constant) or ultra low-k dielectric materials, such as hydrogen silsesquioxane polymer (HSQ), methyl silsesquioxane polymer (MSQ), organosilicate glass (SiCOH), and porous SiCOH. The dielectric layer 34 can also be other dielectric materials, taking into consideration the fragility of the materials. That is, the material for the dielectric layer 34 should not be too fragile as this layer is subject to stresses imposed from packaging processes. Each of the dielectric layers 30, 32 and 34 can be formed using conventional deposition and patterning processes, e.g., chemical vapor deposition (CVD), lithography and etching processes.

In the processes of forming the wiring structures 28, in separate processes after deposition and patterning of individual dielectric layers, a resist is formed on a respective dielectric layer 32 and 34. The resist is exposed to energy (light) to form a pattern (opening). The respective exposed dielectric layers 32 and 34 then undergo a conventional reactive ion (RIE) process to form a trench within each layer. Metal is deposited within the trench to form the metal wiring structures 28 (on each level of the chip 12). The metal can be deposited using, for example, a conventional CVD process, metal sputtering or other metal deposition process known to those of skill in the art. The resist is removed using, for example, an oxygen ashing process, with any remaining metal removed from the underlying dielectric layer 32 and 34 using a conventional chemical mechanical polishing (CMP) step. A passivation layer 36, e.g., SiN, SiCN or SiC, etc. is deposited on the metal wiring structures 28 and each respective dielectric layer 32 and 34 using a conventional CVD process, for example, to protect the metal during subsequent fabrication processing.

A plurality of vias 26 is formed in electrical contact with each of the metal wiring structures 28. The vias 26 can be formed through the passivation layers 36 and respective dielectric layers 32 and 34 (e.g., SiCOH and $SiO_2$). In the process of forming each of the vias 26, a resist is formed on a respective dielectric layers 32 and 34, which is exposed to energy (light) to form a pattern (opening). The underlying dielectric layers 32 and 34 and respective passivation layer 36 then undergo a conventional reactive ion (RIE) process to form a via in each level. Metal is deposited within the via to form the metal vias 26 (on each level of the chip 12). The metal can be deposited using, for example, a conventional chemical vapor deposition (CVD) process, metal sputtering or other metal deposition process known to those of skill in the art. The resist is removed using, for example, an oxygen ashing process, with any remaining metal removed from the underlying dielectric layer 32 and 34 using a conventional chemical mechanical polishing (CMP) step.

Still referring to FIG. 3a, the waveguide structure 10 can be formed from an SOI wafer 38. In the SOI wafer implementation, for example, an insulation layer (e.g., BOX) 38b is formed on top of a wafer (bulk substrate) 38a, with an active semiconductor layer 38c (e.g., active silicon) formed on the BOX 38b. In embodiments, the constituent materials of the SOI wafer 38 may be selected based on the desired end use application of the semiconductor device. For example, the BOX 38b may be composed of oxide, such as $SiO_2$. Moreover, the active semiconductor layer 38c can be comprised of various semiconductor materials, such as, for example, Si, SiGe, SiC, SiGeC, etc. The SOI wafer 38 may be fabricated using techniques well known to those skilled in the art, e.g., oxygen implantation (e.g., SIMOX), wafer bonding, etc.

In embodiments, the waveguide structure 10 is Si, formed from patterning of the semiconductor layer 38c. This patterning can be performed using conventional CMOS processes as already described herein, e.g., lithography and etching processes. After formation of the waveguide structure 10, an optical sensor 40 for converting the optical signal to an electrical signal can be fabricated on the waveguide structure 10 using conventional deposition and patterning processes. In embodiments, the optical sensor 40 is composed of Ge encapsulated with, for example, an encapsulation material, e.g., SiN or $SiO_2$. The optical sensor 40 can be connected to the active devices of the present invention using a via structure 42 fabricated in the dielectric layer 30.

FIG. 3a further shows a cross sectional view of the optical fiber 14. In embodiments, the optical fiber 14 can include a core section 14' surrounded by a sheath 14". In embodiments, the core section 14' is glass with a higher index of refraction than the sheath 14". In this way, light can be transmitted effectively through the core section 14' (with minimum loss of light), directly to the waveguide structure 10. In embodiments, the optical fiber 14 can be embedded or bonded to the wafer substrate 38a, using conventional bonding methods. In embodiments, the optical fiber 14 can be inserted through a slot of the crack stop 20 (shown in FIG. 2), after dicing operations.

Figure 3B:
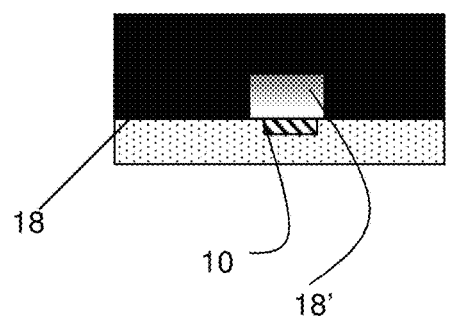
FIG. 3b shows an exploded view of a guard ring structure and waveguide structure with a gap in accordance with aspects of the present invention.

FIG. 3b shows an exploded view of a guard ring structure 18 and waveguide structure 10 in accordance with aspects of the present invention. In this view, it is shown that the gap 18' is surrounded by metal structures of the guard ring or seal edge structure 18. Accordingly, metal structures can be provided on the same level as the gap 18', with the gap 18' directly above the waveguide structure 10. As shown in this orientation, the gap 18' can be considered a vertical gap above the waveguide structure 10.

Figure 4:
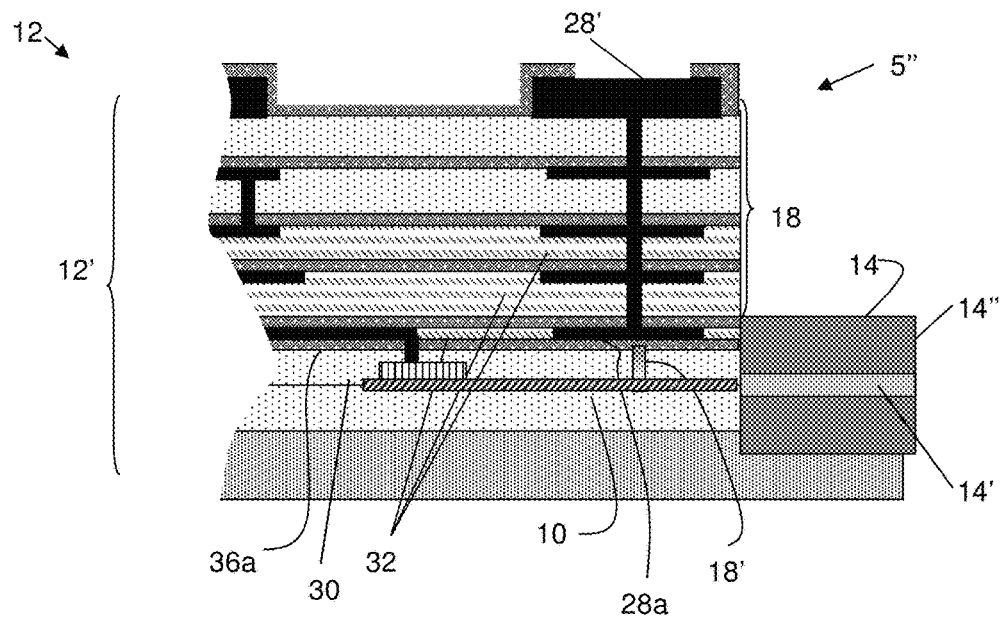
FIG. 4 shows processing steps and a respective structure in accordance with additional aspects of the present invention.

FIG. 4 shows processing steps and a respective structure 5" in accordance with additional aspects of the present invention. In this structure 5", a passivation layer 36a is formed directly below the first wiring structure 28a of the guard ring or seal edge structure 18, above the gap 18'. More specifically, the passivation layer 36a is formed directly on the dielectric layer 30 to provide a hermetic seal protecting the underlying metal structures from oxidation due to moisture diffusing into the active regions through the dielectric layers 32, e.g., SiCOH. In embodiments, the passivation layer 36a can SiN, SiCN or SiC, etc., deposited using a conventional CVD process.

Figure 5:
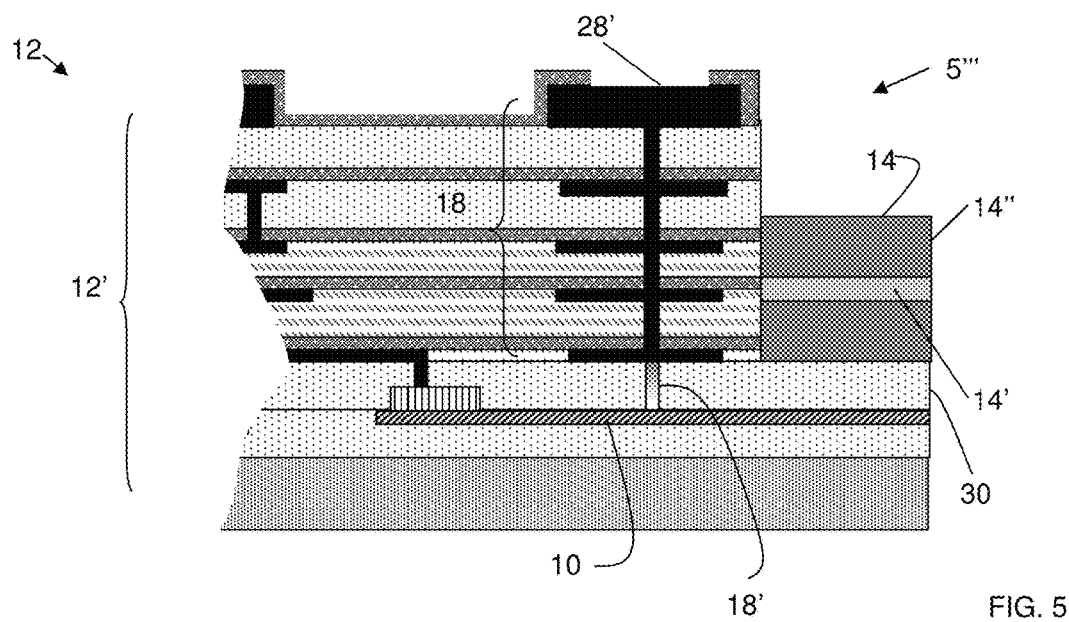
FIG. 5 shows processing steps and a respective structure in accordance with additional aspects of the present invention.

FIG. 5 shows processing steps and a respective structure 5''' in accordance with additional aspects of the present invention. In this structure 5''', the fiber optic 14 is positioned on the dielectric layer 30, above the gap 18' and the waveguide structure 10. In this embodiment, for example, the fiber optic 14 can be bonded to the dielectric layer (e.g., SiCOH) 30 using conventional bonding techniques.

Figure 6:
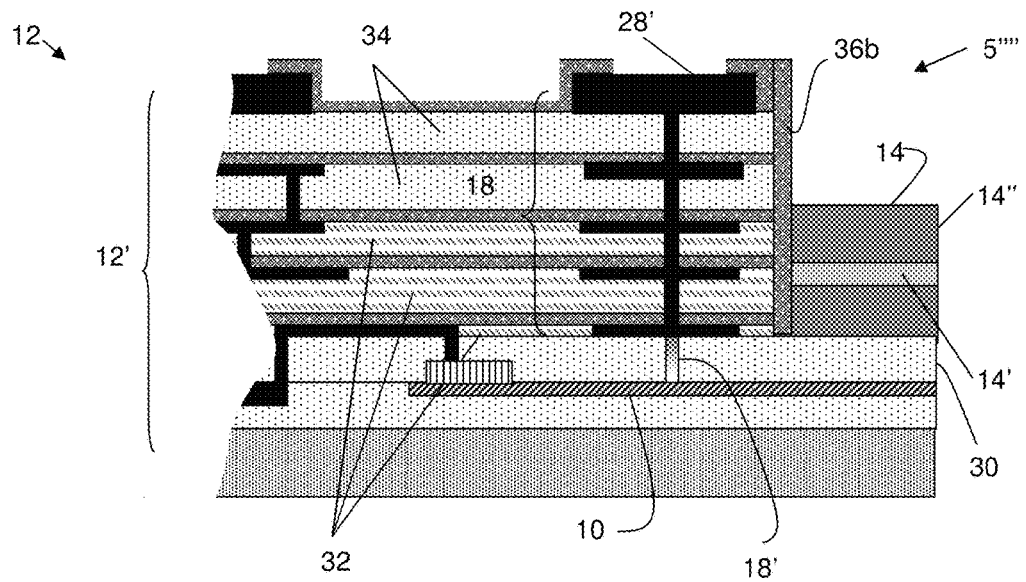
FIG. 6 shows processing steps and a respective structure in accordance with additional aspects of the present invention.

FIG. 6 shows processing steps and a respective structure 5'''' in accordance with additional aspects of the present invention. In this structure 5'''', the fiber optic 14 is positioned on the dielectric layer 30 above the gap 18' and the waveguide structure 10, in addition to a passivation layer 36b formed directly adjacent to exposed dielectric layers, e.g., dielectric layers 34. In this implementation, the passivation layer 36b is formed directly on any exposed vertical sides of the dielectric layers on the side of the guard ring or seal edge structure 18 in order to protect the metal structures from oxidation due to moisture diffusing through the dielectric layers 32 and/or 34. In embodiments, the passivation layer 36b can be SiN, SiCN or SiC, etc., deposited using a conventional CVD process.

Figure 7:
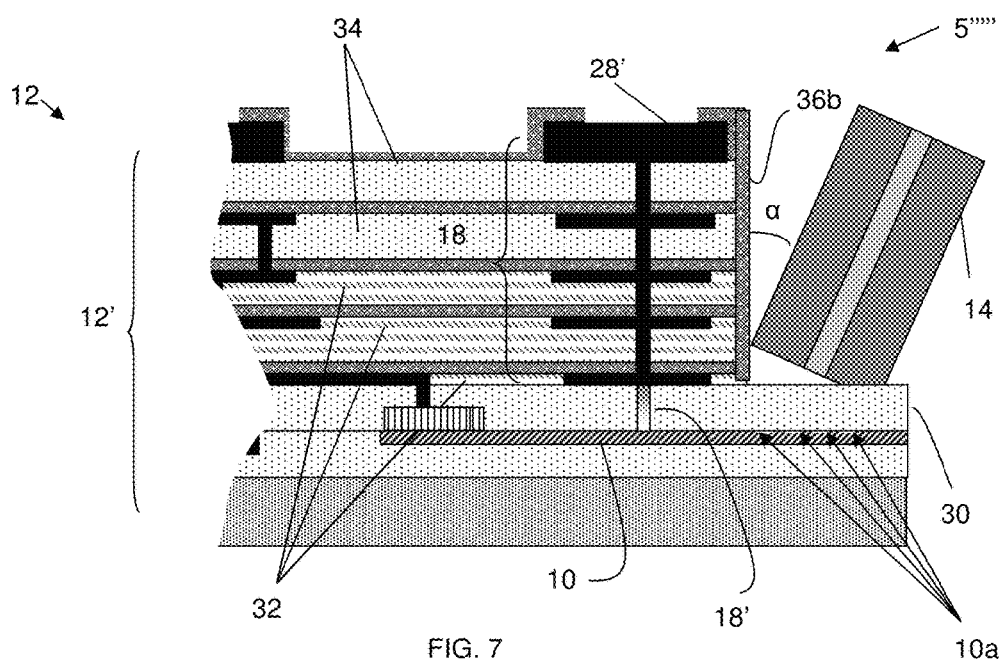
FIG. 7 shows processing steps and a respective structure in accordance with additional aspects of the present invention.

FIG. 7 shows processing steps and a respective structure 5''''' in accordance with additional aspects of the present invention. In this structure 5''''', the fiber optic 14 is positioned on the dielectric layer 30 at a vertical angle α, above the gap 18' and the waveguide structure 10. In addition, this structure 5'''' can include an optional passivation layer 36b formed directly adjacent to exposed dielectric layers, e.g., dielectric layers 30, 32 and 34, on the side of the guard ring or seal edge structure 18. In embodiments, the angle α is any vertically oriented angle, e.g., 0<α≥90 degrees. This embodiment further includes gratings 10a (in optical alignment with the fiber optic 14) formed in the waveguide structure 10 in order to direct light from the fiber optic 14 through the waveguide structure 10. The grating coupler 10a can be formed using conventional lithography and etching processes, with the spacing being adjusted to accommodate different wavelengths of light.

It should be understood by those of skill in the art that FIGS. 1-7 show various respective structures and related processing steps in accordance with various aspects of the present invention. As should be understood by those of skill in the art, each of the structures formed in FIGS. 1-7 can be fabricated using conventional CMOS processes as described herein. Also, any of the structures shown in FIGS. 1-7 can be provided in any combination. By way of example, the passivation layers 36a and 36b can be provided in any aspect of the present invention.

Figure 8:
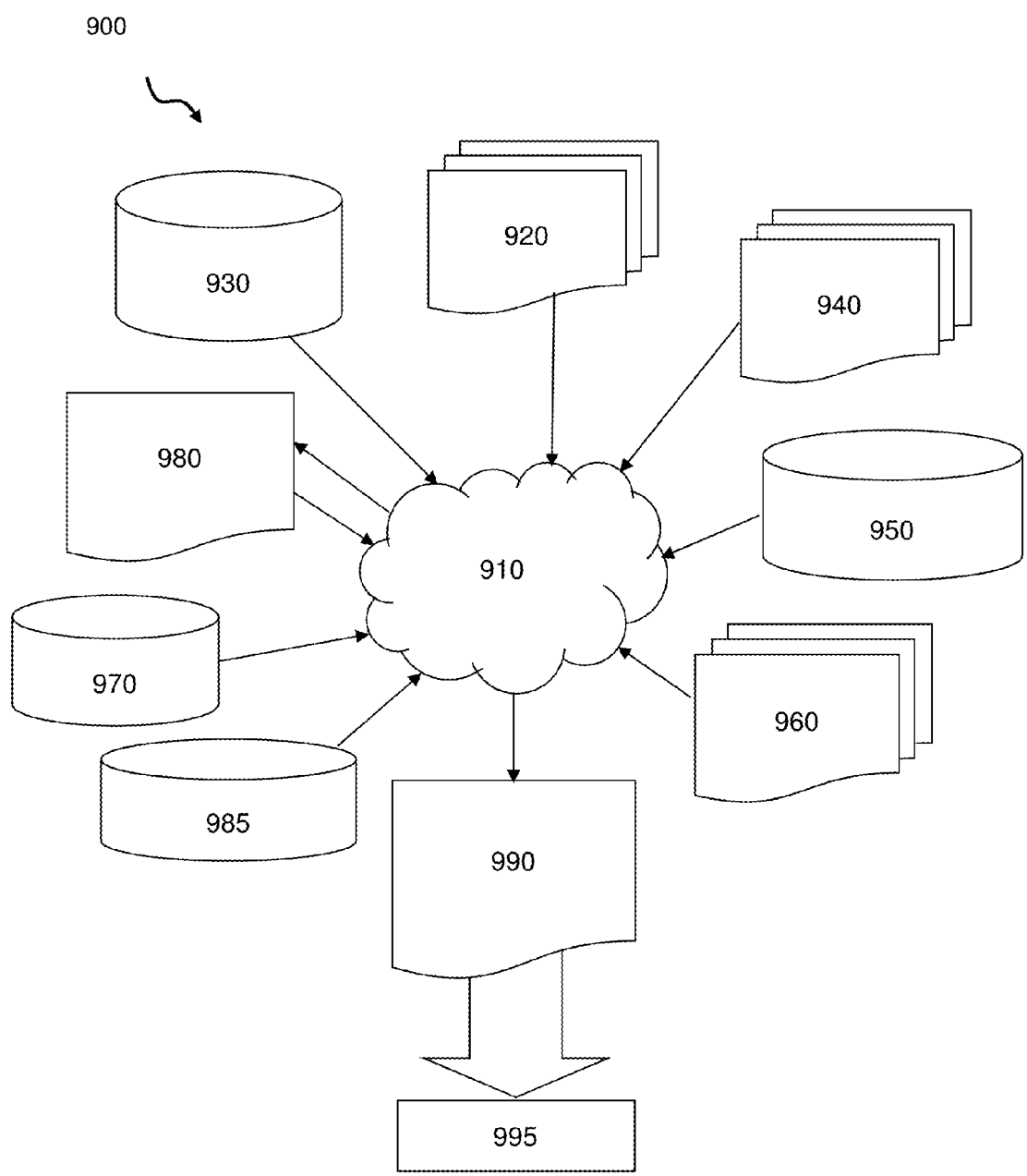
FIG. 8 is a flow diagram of a design process used in semiconductor design, manufacture, and/or test.

FIG. 8 is a flow diagram of a design process used in semiconductor design, manufacture, and/or test. FIG. 8 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1-7. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-7. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-7 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-7. In one embodiment, design structure 990 may comprise a compiled, executable HDL simulation model that functionally simulates the devices shown in FIGS. 1-7.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-7. Design structure 990 may then proceed to a stage 995 where, for example, design structure 990: proceeds to tape-out, is released to manufacturing, is released to a mask house, is sent to another design house, is sent back to the customer, etc.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure, comprising:
   a guard ring structure having a vertically extending side wall surrounding one or more sides of an active region of an integrated circuit chip comprised of multiple horizontal levels;
   a gap formed within and defined by portions of the vertically extending side wall of the guard ring structure which is located at a predetermined level below at least one of the multiple horizontal levels of the integrated circuit chip;
   a waveguide structure formed on a substrate of the integrated circuit chip; and
   a fiber optic optically coupled to the waveguide structure through the gap formed in the vertically extending sidewall of the guard ring structure,
   wherein the gap in the vertically extending sidewall of the guard ring structure is directly above the waveguide structure.

2. The structure of claim 1, wherein the gap has a spacing of about 1 µm to 50 µm.

3. The structure of claim 1, wherein the waveguide structure is Si and the fiber optic comprises a core section surrounded by a sheath, the fiber optic optically coupled to the waveguide structure is at the predetermined level of the integrated circuit chip through the gap, and the core section comprises glass with a higher index of refraction than the sheath.

4. The structure of claim 1, further comprising an optical sensor comprising Ge and encapsulated with SiN, and the optical sensor is coupled to the waveguide structure and is connected to circuitry in the active region of the integrated circuit chip.

5. The structure of claim 1, wherein the fiber optic is directly bonded to the substrate.

6. The structure of claim 1, wherein the guard ring structure comprises a plurality of metal wiring structures and vias within interlevel dielectric layers on one or more wiring levels of the integrated circuit chip.

7. The structure of claim 6, further comprising a passivation layer above the gap and below a first wiring structure of the plurality of metal wiring structures.

8. The structure of claim 7, wherein the passivation layer is provided at the predetermined level of the integrated circuit chip and is structured to prevent moisture from corroding metal structures.

9. The structure of claim 6, wherein the fiber optic is positioned above the waveguide structure on an upper dielectric layer of the interlevel dielectric layers.

10. The structure of claim 9, further comprising a passivation layer located on vertical sides of the interlevel dielectric layers.

11. The structure of claim 6, wherein the waveguide structure includes a grating coupler with predetermined spacing.

12. An integrated circuit chip comprising:
    a guard ring structure around a perimeter of the integrated circuit chip, the guard ring structure comprising a plurality of metal wiring structures and vias within interlevel dielectric layers on one or more wiring levels of the integrated circuit chip;
    a waveguide structure formed on a first device layer of the integrated circuit chip above a wafer substrate; and a fiber optic optically coupled to the waveguide structure through a vertically aligned gap between the guard ring structure and the waveguide structure, the vertically aligned gap being located within the integrated circuit chip directly above the waveguide structure, below a top of the guard ring structure, and being surrounded by metal of the guard ring structure, wherein an end of the fiber optic adjacent the integrated circuit chip has a vertical orientation at an angle of less than 90 degrees with respect to vertical sides of the guard ring structure.

13. The integrated circuit chip of claim 12, further comprising an optical sensor comprised of Ge and encapsulated with SiN, and the optical sensor is coupled to the waveguide structure and is connected to circuitry of the integrated circuit chip.

14. The integrated circuit chip of claim 12, wherein the fiber optic comprises a core section surrounded by a sheath, the fiber optic is bonded to one of the substrate and an interlevel dielectric of the interlevel dielectric layers, and the core section comprises glass with a higher index of refraction than the sheath.

15. The integrated circuit chip of claim 12, further comprising a passivation layer above the gap and below a first wiring structure of the plurality of metal wiring structures.

16. The integrated circuit chip of claim 12, further comprising a passivation layer located on vertical sides of the interlevel dielectric layers and the vertically aligned gap is at the level of a first interlevel dielectric layer beneath the plurality of metal wiring structures and vias of the integrated circuit chip.

17. The integrated circuit chip of claim 12, wherein:
the waveguide structure includes a grating coupler with predetermined spacing and in optical alignment with the fiber optic.

18. A method, comprising:
forming a guard ring structure comprising a vertically extending side wall surrounding one or more sides of an active region of an integrated circuit chip, the guard ring including a gap formed within and defined by portions of the vertically extending side wall at a predetermined level of the integrated circuit chip;

forming a waveguide structure on a substrate of the integrated circuit chip; and forming a fiber optic optically coupled to the waveguide structure through the gap formed in the vertically extending sidewall of the guard ring structure, wherein the gap in the vertically extending sidewall of the guard ring structure is directly above the waveguide structure and below at least one of multiple horizontal levels of the integrated circuit chip, and the fiber optic has a vertical orientation at an angle of less than 90 degrees with respect to vertically extending side wall of the guard ring structure.

19. The structure of claim 1, further comprising a crack stop structure surrounding the guard ring structure to prevent propagation of cracks during a dicing process, and the fiber optic is inserted in a slot of the crack stop after the dicing process.

20. The structure of claim 1, wherein the fiber optic has a vertical orientation at an angle of less than 90 degrees with respect to the vertically extending side wall of the guard ring structure.

* * * * *